US006433472B2

(12) United States Patent
Kimura

(10) Patent No.: US 6,433,472 B2
(45) Date of Patent: Aug. 13, 2002

(54) NEON LAMP PRODUCTION METHOD AND SYSTEM

(75) Inventor: Toru Kimura, Tokyo (JP)

(73) Assignee: Toyokawa Denki Co., Ltd., Tokyo (JP)

( * ) Notice: Subject to any disclaimer, the term of this patent is extended or adjusted under 35 U.S.C. 154(b) by 78 days.

(21) Appl. No.: 09/765,006

(22) Filed: Jan. 18, 2001

(30) Foreign Application Priority Data

Feb. 3, 2000 (JP) ....................................... 2000-026235

(51) Int. Cl.[7] .................................................... H02J 1/62
(52) U.S. Cl. ....................................... 313/493; 313/634
(58) Field of Search ................................ 313/493, 634, 313/637

(56) References Cited

U.S. PATENT DOCUMENTS 5,532,543 A * 7/1996 Van Der Leeuw et al. . 313/634

FOREIGN PATENT DOCUMENTS

JP 50-136976 11/1975
JP 57-032545 2/1982

* cited by examiner

*Primary Examiner*—Vip Patel
(74) *Attorney, Agent, or Firm*—Kramer Levin Naftalis & Frankel LLP

(57) ABSTRACT

A neon lamp including a sealed glass bulb, electrodes and leads connected to the electrodes has a flat head whose center region descends into the interior of the sealed glass bulb. A method of producing the neon lamp includes steps of charging neon gas into a glass tube through a fine glass tube at the head of the glass tube, sealing the fine glass tube to obtain a sealed glass bulb having a projecting tip portion, removing excess glass of the projecting tip portion, and shaping the projecting tip portion into a substantially flat or lenticular head portion. A system for producing the neon lamp includes a shaping head for accommodating the sealed glass bulb with its projecting tip portion exposed outside the shaping head, heating means for melting the projecting tip portion, a projecting tip cutter for removing excess glass of the projecting tip portion, and a head presser for shaping the projecting tip portion into a substantially flat or lenticular shape.

8 Claims, 6 Drawing Sheets

NEON LAMP PRODUCTION METHOD AND SYSTEM

BACKGROUND OF THE INVENTION

1. Field of the Invention

This invention relates to a small neon lamp, a method of producing the neon lamp, and a system for producing the neon lamp.

2. Background Art

Small neon lamps are used chiefly as pilot lamps in camera stroboscopic flash units. FIG. 7 shows the structure and shape of a typical small neon lamp 100.

The neon lamp 100 is composed of a sealed glass bulb filled with neon gas, electrodes 2, 2 disposed inside the glass bulb, and leads 3, 3 connected to the electrodes 2, 2. The head portion 4 of the glass bulb is formed with a projecting tip portion 40. The projecting tip portion 40 is a vestige formed when, as explained later, a thin glass pipe portion is fused after charging the glass bulb with neon gas.

When the neon lamp is used as a pilot lamp, the projecting tip portion 40 is a nuisance because, for instance, it takes up extra installation space, makes emitted light hard to see when positioned in the line of sight, and is apt to break during installation.

Two methods have been developed for producing a flat-headed neon lamp without the projecting tip portion.

One method is substantially the same as the method used to produce subminiature electric lamps. In this method, two electrodes are fixed together by a glass bead and the result is inserted into an opening in a glass bulb of U-shaped cross-section, the glass bulb is evacuated of air and charged with a neon gas while taking care to prevent dropout of the bead-fixed electrodes, the glass bead is fused to the glass bulb, and superfluous glass cut away to obtain a lamp.

In the other method, two electrodes are sealed within one end of a glass tube and the result is fabricated into a bulb whose other end (head) is left open for evacuation of air and charging of neon gas. Next, in a vacuum apparatus, the bulb is evacuated and charged with neon gas, whereafter fabrication of the lamp is completed by using a carbon heater to fuse the head portion and seal the opening.

These methods of producing a neon lamp eliminate the problems caused by the presence of a projecting tip portion but have the following problems of their own:

1) As the DC current applied to a neon lamp fabricated by one of the foregoing methods rises, the point of discharge moves away from the center of the electrodes toward the tip. This adversely affects the lamp discharge characteristics.

2) In both methods, production cost is increased by the need to employ special equipment.

3) In the latter method, cost is increased because relatively expensive electric power is required to operate the carbon heater used to fuse the glass in the vacuum apparatus. Moreover, the fact that the glass tube has to be manually transferred to the vacuum apparatus after sealing the electrodes in the glass tube requires the method to be carried out as a time-consuming batch operation.

One object of the present invention is therefore to provide a neon lamp capable of preventing the unwanted discharge mentioned above.

Another object of the present invention is to provide a method of and a system for producing a flat-headed neon lamp capable of fully utilizing conventional production equipment without need for expensive special equipment.

SUMMARY OF THE INVENTION

In its first aspect, the present invention achieves these objects by providing a neon lamp comprising a sealed glass bulb disposing electrodes inside the glass bulb, and leads connected to the electrodes, the sealed glass bulb having a flat or lenticular head portion whose center region descends into the interior of the sealed glass bulb.

The neon lamp according to the first aspect of the invention effectively overcomes the problem regarding discharge characteristics mentioned above. Although the discharge starting voltage of a neon lamp depends almost entirely on the pressure of the neon gas and the distance between the electrodes, a DC-operated neon lamp such as a stroboscopic flash pilot lamp may, depending on the state of the electrodes and other factors, experience a shift in the discharge point away from the middle toward the tip of the electrodes as the applied DC voltage increases. This shift makes the characteristics of the lamp unstable.

When the center region of the glass head portion is formed to descend into the interior of the sealed glass bulb as in the first aspect of the invention, however, shifting of the discharge point and associated flicker are prevented and the characteristics of the neon lamp are stabilized.

In its second aspect, the present invention achieves the foregoing objects by providing a method of producing a neon lamp comprising a step of charging inert gas such as neon into a glass tube preinstalled with electrodes and leads at a head portion of the glass bulb, a step of sealing the glass tube to obtain a sealed glass bulb having a projecting tip portion, a step of removing excess glass of the projecting tip portion, and a step of shaping the projecting tip portion into a substantially flat or lenticular head portion.

The step of removing excess glass of the projecting tip portion is for adjusting the amount of descent when the head portion of the glass bulb is formed to descend into the interior of the sealed glass bulb.

In the production method according the present invention, the projecting tip portion is shaped after removal of excess glass. The head portion of the neon lamp can therefore be made substantially flat or lenticular and, in addition, can be shaped to descend inward by utilizing negative pressure generated inside the sealed glass bulb to suck the glass of the projecting tip portion inward.

In its third aspect, the present invention achieves the foregoing objects by providing a system for producing a neon lamp comprising a shaping head for accommodating a sealed glass bulb containing inert gas such as neon and having a projecting tip portion, with the projecting tip portion exposed outside the shaping head, a projecting tip cutter for removing excess glass of the projecting tip portion, and a head presser for shaping the projecting tip portion into a substantially flat or lenticular shape.

The system according to the present invention can be configured by combining an existing sealed glass bulb production apparatus with a shaper composed of a shaping head, a projecting tip cutter, and a head presser.

The system is therefore capable of producing both conventional neon lamps like that shown in FIG. 7 and neon lamps according to the present invention.

BRIEF EXPLANATION OF THE DRAWINGS

FIG. 2(*b*) is a cross-sectional view taken along line B—B in FIG. 1.

DESCRIPTION OF THE PREFERRED EMBODIMENTS

Figure 1:
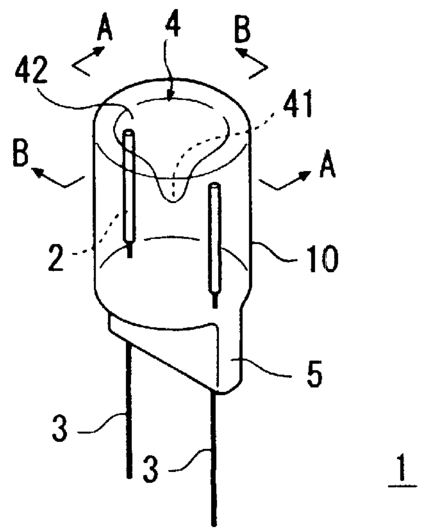
FIG. 1 is a perspective view of a neon lamp that is an embodiment of the invention.
Figure 2:
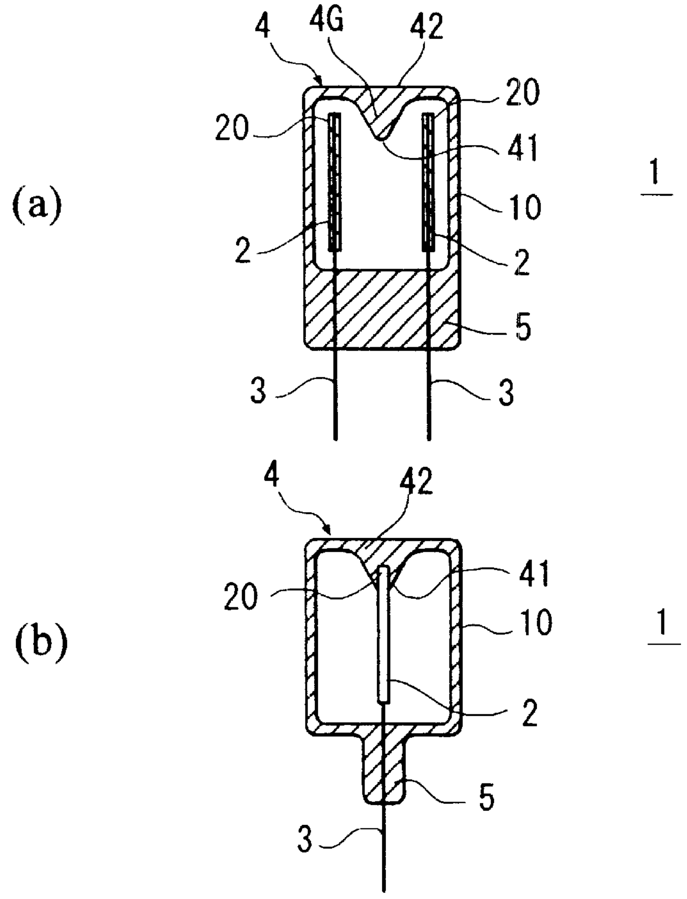
FIG. 2(*a*) is a cross-sectional view taken along line A—A in FIG. 1.

Embodiments of the neon lamp, neon lamp production method and neon lamp production system according the present invention will now be explained with reference to the drawings. FIG. 1 is a perspective view of a neon lamp 1 that is an embodiment of the invention. FIGS. 2(*a*) and 2(*b*) show cross-sectional views taken along lines A—A and B—B in FIG. 1.

Figure 3:
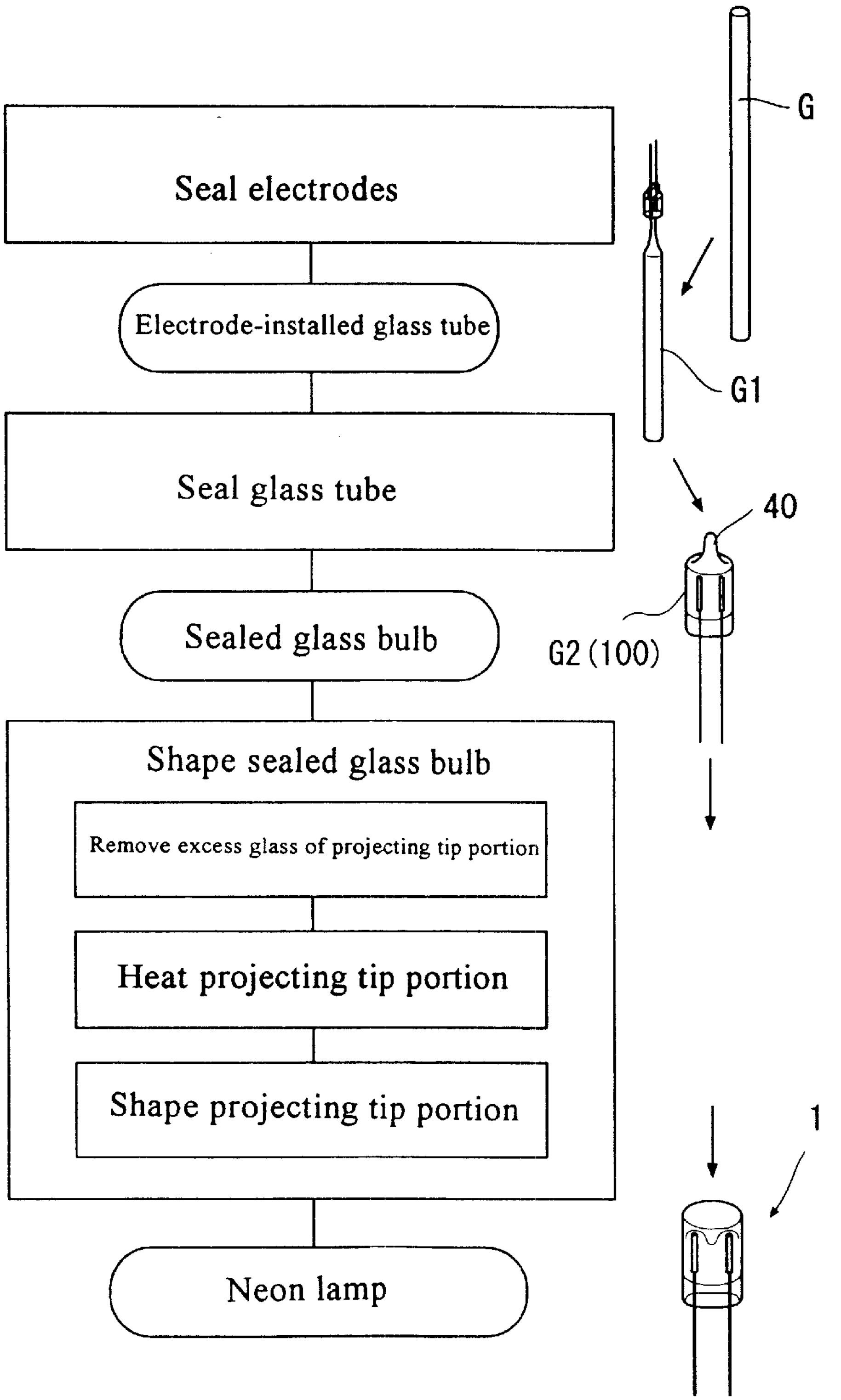
FIG. 3 is a process flow diagram of a production method that is an embodiment of the invention.
Figure 4:
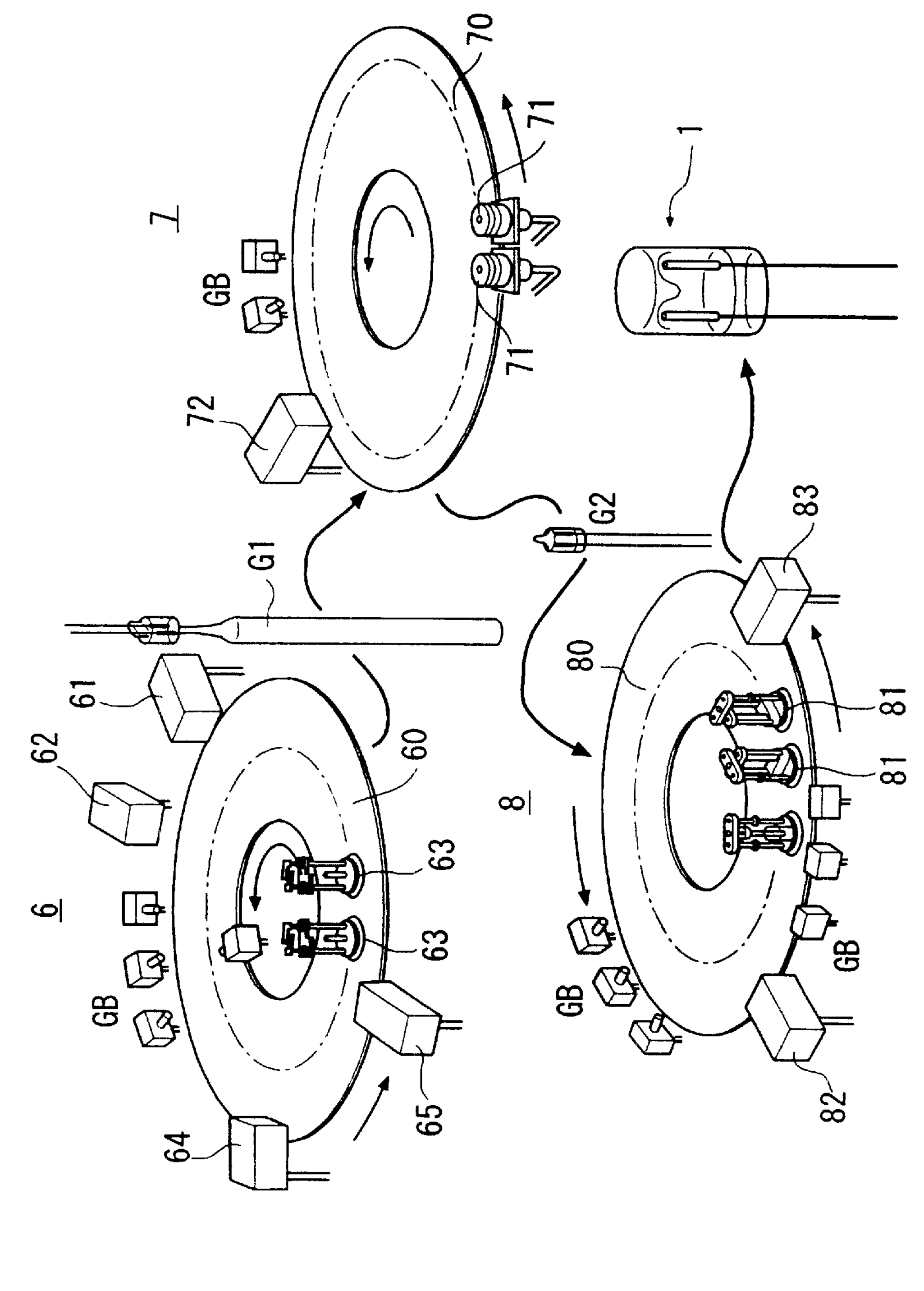
FIG. 4 is a perspective view of a system for producing a neon lamp that is an embodiment of the invention.
Figure 5:
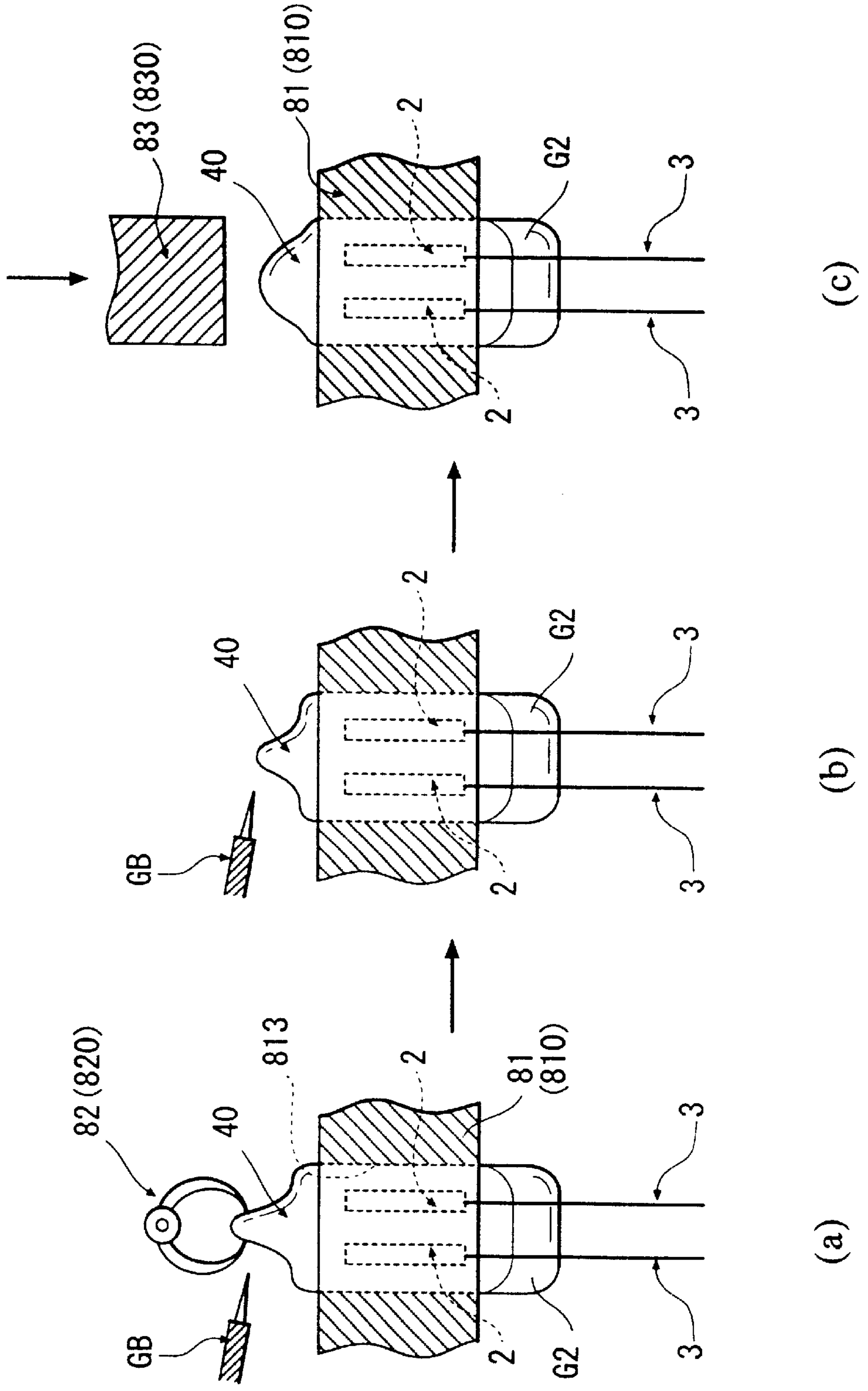
FIG. 5 is a schematic diagram illustrating a shaper of the system of FIG. 4.
Figure 6:
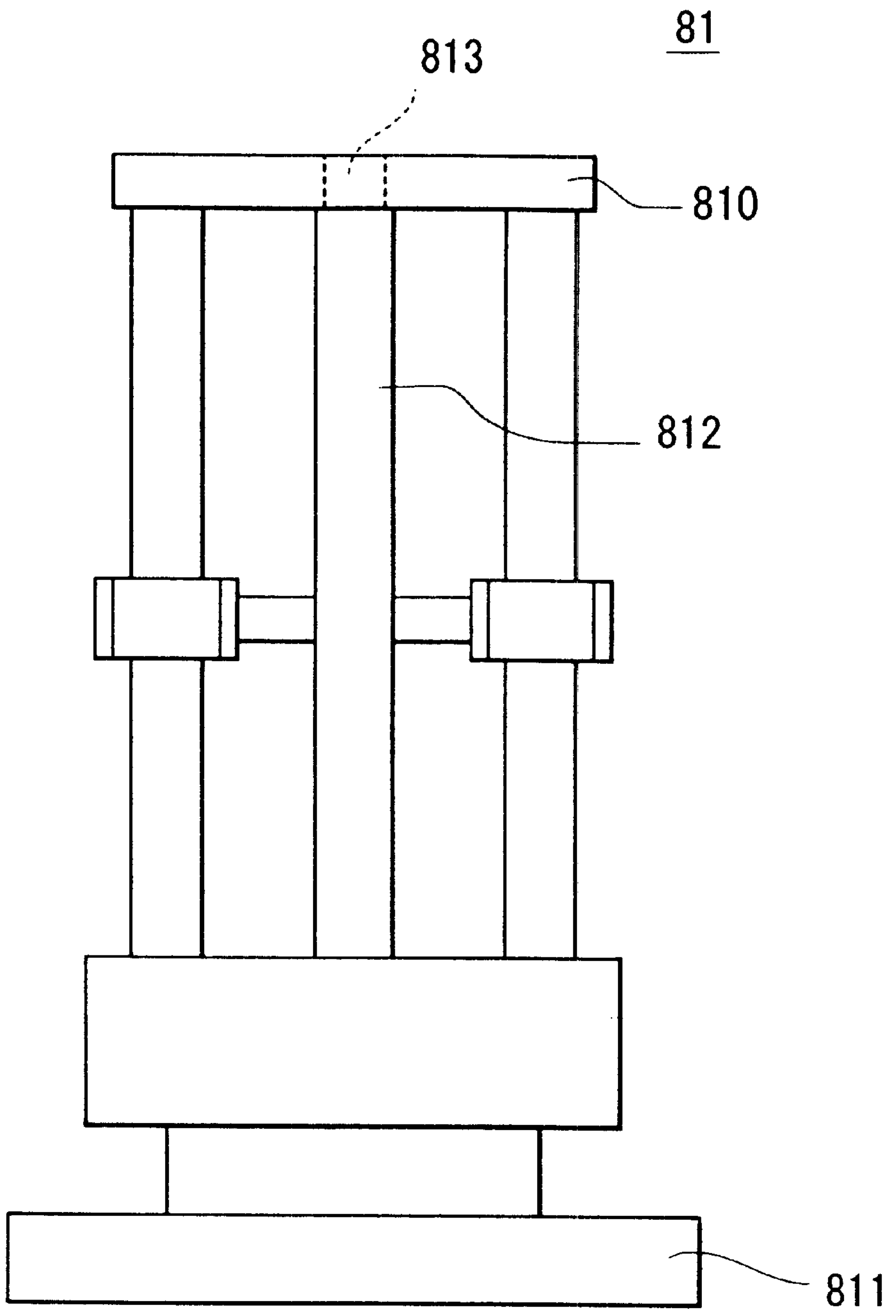
FIG. 6 is a front view of a shaping head of the shaper of FIG. 5.

FIG. 3 shows the process flow in a method of producing the neon lamp 1, and FIG. 4 shows a system for implementing the method, along with the steps of the production process. FIG. 5 shows substeps (a) to (c) of the sealed glass bulb shaping step of the production process. FIG. 6 is a front view of a shaping head used in the shaping step.

Like members are assigned like reference symbols throughout the seven attached figures.

Figure 7:
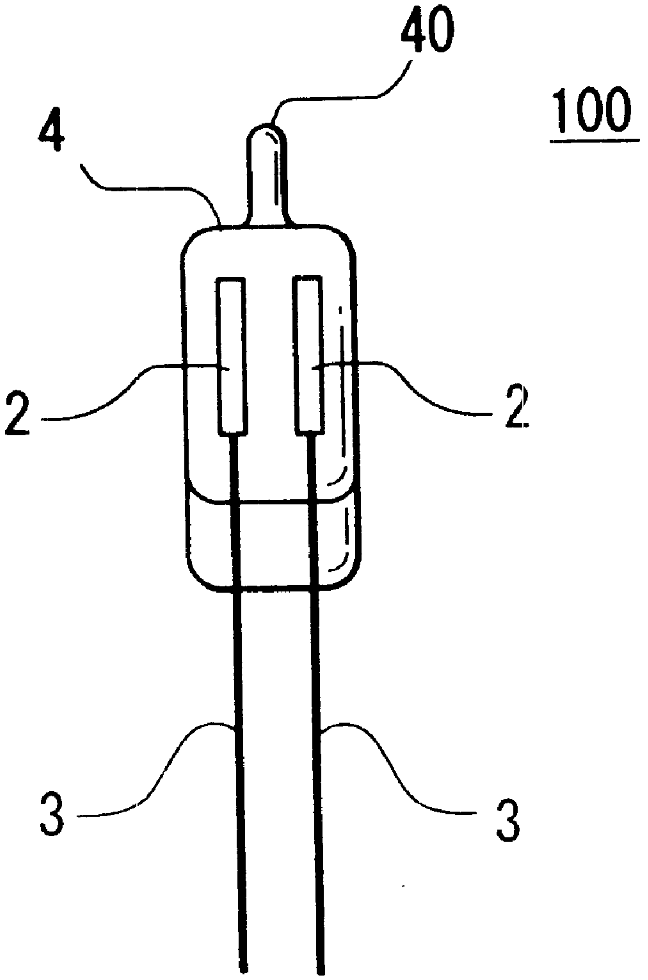
FIG. 7 PRIOR ART
FIG. 7 is a front view of a prior art neon lamp.

Similar to the neon lamp 100 shown in FIG. 7, the neon lamp 1 according to the embodiment of the invention illustrated in FIGS. 1 and 2 is composed of a sealed glass bulb 10 filled with an inert gas such as neon, electrodes 2, 2 disposed inside the glass bulb, and leads 3, 3 connected to the electrodes 2, 2. The leads 3, 3 run in parallel from the electrodes 2, 2 to the exterior through a seal member 5 on the base side of the neon lamp 1.

The neon lamp 1 differs structurally from neon lamp 100 in that the head portion 4 at the tip end thereof is formed to include an approximately central pendant portion 41 that descends into the bulb 10, and the glass 4G of the head portion 4 is formed to have a substantially flat upper surface 42.

The pendant portion 41 is formed at the approximate central region of the glass 4G in the general shape of an inverted cone directed toward the seal member 5.

As shown in FIGS. 2(*a*) and 2(*b*), the pendant portion 41 extends downward to between the tips 20, 20 of the electrodes 2, 2 in the manner of blocking the discharge path between the tips 20, 20 of the electrodes 2, 2.

The pendant portion 41 therefore blocks discharge between the tips 20, 20 of the electrodes 2, 2, thereby preventing discharge point shift and associated flicker.

Moreover, visibility of light emitted by the neon lamp when viewed in a direction perpendicular to the head portion 4 is excellent because the upper surface 42 of the head portion glass 4G is formed substantially flat. The flat shape of the head portion also minimizes defects owing to neon lamp breakage during handling, particularly during installation in a camera stroboscopic flash unit or other device.

The upper surface 42 of the glass 4G of the neon lamp 1 need not necessarily be substantially flat, however, and can instead be formed to have a lenticular shape (the shape of a convex lens). A head portion formed of glass 4G having the shape of a convex lens provides a light condensing effect.

An embodiment of the neon lamp production method according to the present invention will now be explained with reference to FIG. 3.

The production method comprises an electrode sealing step of fabricating an electrode-installed glass tube G1 by sealing electrodes in one end of a glass tube G, a glass tube sealing step of fabricating a sealed glass bulb G2 by evacuating air from, charging gas through, and sealing the other end of the electrode-installed glass tube G1, and a sealed glass bulb shaping step of flattening the projecting tip portion 40 of the sealed glass bulb G2.

As shown in FIG. 3, the shaping step is conducted by removing excess glass from the projecting tip portion 40 of the electrode-installed glass tube G1, heating the projecting tip portion 40 and shaping the projecting tip portion 40 into a flat or lenticular shape.

As explained earlier, the neon lamp 1 of this embodiment is characterized in that central region of the glass 4G descends into the lamp interior.

To achieve this configuration, the amount of pendant glass is optimized by removing excess glass from the projecting tip portion 40 prior to the step of flattening the projecting tip portion 40 and carrying out the flattening so as to give the pendant portion 41 a conical shape.

In the foregoing production method, flattening is conducted while progressively melting the projecting tip portion 40 of the sealed glass bulb G2. A neon lamp 1 having a head portion 4 that is formed to be substantially flat and whose center region descends into the interior of the neon lamp 1 can therefore be produced without use of expensive special equipment.

A production system for implementing the foregoing method will now be explained with reference to FIGS. 4 and 5. The part of the system for conducting the electrode sealing step and the tube sealing step will be explained with reference to FIG. 4 and the part of the system for conducting the shaping step will be explained with reference to FIG. 5.

The system is equipped with a sealer 6, an exhauster 7 and a shaper 8.

The electrode sealing apparatus 6 conducts the electrode sealing step. As shown in FIG. 4, the sealer 6 is equipped with a turntable 60, a glass tube feeder 61 located near the peripheral edge of the turntable 60, an electrode feeder/coater 62, sealing heads 63 mounted at prescribed intervals on the turntable 60 (only two shown), gas burners GB, an electrode sealer 64, and a tubing device 65. A glass tube G (shown in FIG. 3) supplied by the glass tube feeder 61 and electrodes with attached leads supplied by the electrode feeder/coater 62 are set in a sealing head 63, one end of the glass tube G is sealed by the electrode sealer 64 under gradual heating by a gas burner GB, and the tubing device 65 draws the other end of the glass tube G to form it into a glass bulb portion and a fine tube portion, thereby fabricating an electrode-installed glass tube G1.

The exhauster 7, which conducts the tube sealing step, is equipped with a turntable 70, exhaust heads 71, a fuser 72 and gas burners GB. The electrode-installed glass tube G1 is transferred from the electrode sealing apparatus 6 to the turntable 70 of the exhauster 7 by a transfer device (not shown), where its open end is set in an exhaust head 71 which evacuates (vacuumizes) the interior of the electrode-installed glass tube G1 and charges it with gas. The fine tube portion of the electrode-installed glass tube G1 is then sealed by the fuser 72 to fabricate a sealed glass bulb G2.

The operations up to this point produce a neon lamp of the conventional type shown in FIG. 7.

In order to flatten the head portion 4 of the sealed glass bulb G2, the sealed glass bulb G2 is transferred by a linear feeder (not shown) to the shaper 8, which automatically and continuously conducts the shaping step.

As shown in FIG. 4, the shaper 8 is equipped with a turntable 80, shaping heads 81 mounted at prescribed intervals on the turntable 80 to revolve together therewith, a projecting tip cutter 82, a head presser 83, and gas burners GB.

The sealed glass bulb G2 is set in a shaping head 81 (more precisely, in a heat shield portion 810 of the shaping head 81) with its projecting tip portion 40 pointing upward. As shown in FIG. 5, in order to optimize the volume of the pendant portion 41, excess glass is removed from the projecting tip portion 40 by the projecting tip cutter 82 while the projecting tip portion 40 is being gradually heated and annealed by a gas burner GB.

Next, the remaining projecting tip portion 40 is gradually reheated and melted by a gas burner GB and the melted projecting tip portion 40 is flattened from above by the head presser 83.

The head portion 4 of the sealed glass bulb G2 is molded into a flat shape by the heat shield portion 810 of the shaping head 81. This completes production of the neon lamp 1.

The production system is thus able to impart a flat shape to the glass 4G merely by combining the shaper 8 with existing production equipment (the electrode sealing apparatus 6 and the exhauster 7) for production of the sealed glass bulb G2 and does not require installation of expensive special equipment.

Since it is constituted by combining the shaper 8 with existing equipment 6 and 7, it can also produce not only the neon lamp 1 but also the prior art neon lamp 100 (which is the same as the sealed glass bulb G2).

The electrode sealing apparatus 6, exhauster 7 and shaper 8 are similar in basic structure, can share a common operating environment, and can be interconnected in a single line for continuous production.

The production system according to the present invention can also cope flexibly with glass tubes G of different length and diameter.

As shown in FIG. 6, the shaping head 81 includes a mount member 811 by which it is rotatably attached to the turntable 80. The heat shield portion 810 is supported on the mount member 811 by support members 812 that can be adjusted in height.

The heat shield portion 810 is formed at its center with a hole 813 for insertion of a sealed glass bulb G2. The sealed glass bulb G2 can be inserted in the hole 813 so that its projecting tip portion 40 is located outside of the shaping head 81.

The nozzle of each gas burner GB is directed to project a flame toward the upper end of the hole 813 of the heat shield portion 810. The gas burner GB flame therefore contacts and melts only the projecting tip portion 40. The hole 813 of the heat shield portion 810 acts as a mold when the head portion 4 is shaped by the head presser 83 and the heat shield portion 810 shields the main body of the sealed glass bulb G2 from heat.

The projecting tip cutter 82 can be constituted in the manner of the nipper 820 shown in FIG. 5 and be driven by an air cylinder.

The head presser 83 can be constituted in the manner of the vertically air-cylinder-driven presser rod 830 shown in the same figure.

On/off control of the projecting tip cutter 82 and head presser 83 can be conducted using a microsequencer, programmable computer, or cam switch.

The projecting tip cutter and the head presser are not limited to the structures described in the foregoing.

In the neon lamp according to the first aspect of the invention, the pendant portion descending into the sealed glass bulb at the center of the head portion prevents discharge point shift, suppresses flicker and stabilizes the characteristics of the neon lamp.

The production method according to the second aspect of the invention forms the projecting tip portion into a substantially flat or lenticular shape after removing it of excess glass. This enables production of a neon lamp with a substantially flat or lenticular head portion that, in addition, is shaped to descend inward by utilizing negative pressure inside the sealed glass bulb to suck the glass of the projecting tip portion inward.

The production system according to the third aspect of the invention can be configured by utilizing existing equipment for production of sealed glass bulbs in combination with a shaper, composed of a shaping head, projecting tip cutter and head presser, for shaping the projecting tip portion at the head portion of the neon lamp.

The production system can therefore be used as a dual-purpose system capable of producing both conventional neon lamps such as shown in FIG. 7 and neon lamps according to the present invention.

What is claimed is:

1. A lamp, comprising a sealed glass bulb charged with an inert gas, electrodes disposed inside the glass bulb, and leads connected to the electrodes through a base side of the sealed glass bulb, the sealed glass bulb having a flat or lenticular head portion whose approximate center region descends into the interior of the sealed glass bulb.

2. The lamp of claim 1, wherein the inert gas is neon.

3. A method of producing a lamp, comprising the steps of: charging an inert gas into a glass tube preinstalled with electrodes and leads at a head portion of the glass tube, sealing the glass tube to obtain a sealed glass bulb having a projecting tip portion, removing excess glass of the projecting tip portion, and shaping the projecting tip portion into a substantially flat or lenticular head portion.

4. The method of claim 3, wherein an approximate center region of the head portion is formed to descend into the interior of the sealed glass bulb.

5. The method of claim 3, wherein the inert gas is neon.

6. A system for producing a lamp, comprising a shaping head for accommodating a sealed glass tube charged with an inert gas and having a projecting tip portion, the projecting tip portion being exposed outside the shaping head, a projecting tip cutter for removing excess glass of the projecting tip portion, and a head presser for shaping the projecting tip portion into a substantially flat or lenticular shape.

7. The system of claim 6, wherein the head presser shapes an approximate center region of the head portion to descend into the interior of the sealed glass bulb.

8. The system of claim 6, wherein the inert gas is neon.

* * * * *